United States Patent [19]

Rudolph

[11] Patent Number: 4,705,236
[45] Date of Patent: Nov. 10, 1987

[54] AILERON SYSTEM FOR AIRCRAFT AND METHOD OF OPERATING THE SAME

[75] Inventor: Peter K. C. Rudolph, Seattle, Wash.
[73] Assignee: The Boeing Company, Seattle, Wash.
[21] Appl. No.: 306,651
[22] Filed: Sep. 29, 1981
[51] Int. Cl.$^4$ .............................................. B64C 9/04
[52] U.S. Cl. .................................... 244/90 R; 244/215
[58] Field of Search ............... 244/211, 212, 213, 215, 244/216, 219, 90 R

[56] References Cited

U.S. PATENT DOCUMENTS

| | | | |
|---|---|---|---|
| 2,222,935 | 11/1940 | Chilton | 244/225 |
| 2,289,704 | 7/1942 | Grant | 244/225 |
| 2,407,401 | 9/1946 | Clauser et al. | 244/225 |
| 2,422,035 | 6/1947 | Noyes, Jr. | 244/215 |
| 2,620,147 | 12/1952 | Butler et al. | 244/216 |
| 2,836,380 | 5/1958 | Pearson | 244/216 |
| 3,655,149 | 4/1972 | Williams | 244/225 |
| 4,180,222 | 12/1979 | Thornburg | 244/90 R |

FOREIGN PATENT DOCUMENTS

| | | | |
|---|---|---|---|
| 2914974 | 10/1980 | Fed. Rep. of Germany | 244/216 |
| 2003098 | 3/1979 | United Kingdom | 244/216 |
| 2060520 | 5/1981 | United Kingdom | 244/215 |

*Primary Examiner*—Sherman D. Basinger
*Assistant Examiner*—Rodney A. Corl
*Attorney, Agent, or Firm*—Hughes & Cassidy

[57] ABSTRACT

Two aileron assemblies at opposite ends of a wing. Each aileron assembly has an aileron airfoil member having a first stowed position for high speed flight, where aerodynamic contours of the airfoil member match those of the wing. Each aileron airfoil member has a second extended position forming a slot with the trailing edge of the wing. Each airfoil member is slide mounted to a track member which is in turn pivotally mounted to wing structure.

17 Claims, 10 Drawing Figures

AILERON SYSTEM FOR AIRCRAFT AND METHOD OF OPERATING THE SAME

DESCRIPTION

TECHNICAL FIELD

The present invention relates to an aileron system for an aircraft and also to a method for utilizing such an aileron system.

BACKGROUND ART

One of the problems with conventional ailerons is that they provide more than adequate roll control at high speed and not enough at low speed. Thus, the configuration of the aileron is often a compromise where it is oversized for high speed flight and undersized for low speed operation. One prior art method to alleviate this problem is to have high speed midspan ailerons and wing tip ailerons for low speed operation. Additionally, spoilers can be used to augment control. However, the spoiler system does not provide a pure rolling moment but results in an overall loss of lift. Another approach to alleviating this problem is to use trailing edge flaps to augment the otherwise conventional wing tip aileron. However, this requires high rate flap actuators which in turn have penalties in terms of weight and cost.

Airfoils typically used for new transport planes have a fairly high amount of camber on the trailing edge. This results in a cusp on the lower surface and a fairly high boattail angle on the upper surface. The aileron is generally located in this aft portion of the airfoil. The adverse pressure gradients associated with the high boattail angles on the upper surface create a flow condition which causes separation at increased angles of attack or any further increase in boattail angle. Thus, downward deflections more than a moderate amount (e.g. 10° down) do not produce any appreciable increase in lift, since the flow on the upper surface becomes separated. This means that roll control for higher deflection angles in a downward direction becomes very non-linear and ineffective. This is not a problem for high speed flight, because in general only small aileron deflections are required, and the resulting loss in lift is inconsequencial. However, a lift loss at low altitude and low speed, such as during final approach, or during take-off, is highly undesirable. Also, it should be noted that a military transport plane, and particularly an airplane with STOL capabilities, has to perform more severe roll maneuvers than a commercial transport airplane. The slower speeds in a STOL mission make the airplane more sensitive to gust and cross-wind. Also, a military transport, particularly in a STOL mission, will have to fly into fields with poor or no approach guidance system. This means that the airplane has to be able to make major course corrections close to the ground, when landing in poor weather conditions where there is reduced visibility. A roll control system that produces a net loss in airplane lift is therefore dangerous to this application.

In view of the foregoing, it is an object of the present invention to provide an aileron system and method of using the same for effective operation at both high and low speeds, without significant loss of lift in performing a roll maneuver in low speed operation.

DISCLOSURE OF THE INVENTION

The aileron system of the present invention is located on a wing of an airplane for roll control at both high and low speeds. The system comprises two aileron assemblies positioned at opposite sides of the wing at respective aileron locations. Each aileron assembly comprises a mounting structure mounted at the rear end of the wing at its related aileron location for up and down rotation about an axis generally aligned with a spanwise axis of the wing. Each assembly further comprises an aileron airfoil member having a leading edge, a trailing edge, an upper aerodynamic surface and a lower aerodynamic surface. Each airfoil member is movably mounted to said mounting structure for movement between a stowed first position where the upper and lower airfoil surfaces aerodynamically match the upper and lower wing surfaces for roll control for high speed flight, and to an extended high lift second position where the airfoil member forms a slot with a trailing edge of the wing.

There is first actuating means to rotate the mounting structure from an intermediate location upwardly to an upper location and also downwardly to a lower location. Further, there is a second actuating means to move each airfoil between its first and second positions.

Control means are provided to activate both second actuating means to move the airfoil member together between their respective first and second positions, and to actuate both first actuating means oppositely to move the mounting structures oppositely to one another to create a roll moment. Thus, for high speed flight, flap members can be placed in their first position for low drag and high speed roll control, and the airfoil members can be placed in their second positions to create greater lift components to optimize roll control for low speed operation.

Desirably, the two aileron assemblies are characterized in that the intermediate location of each mounting structure is such that the aerodynamic contour of each airfoil member is such that with the two airfoil members in the second position, an increase in upward lift created by a downward movement of the mounting structure in the airfoil member of one aileron assembly matches generally a decrease in upward lift by upward movement of the mounting structure and airfoil member of the other aileron assembly, whereby net lift created by the aileron assemblies does not have substantial variation. Further, with the airfoil members in their second position, and with the mounting structures and the two airfoil members in their intermediate location, the two airfoil members create a net upward lift so that in executing a roll maneuver, the two airfoil members continue to create a net upward lift.

In the preferred form, the wing has a flap system with flap members located inboard of the aileron assemblies. Further, the flaps have a predetermined flap angle for take-off. The intermediate location of the mounting structure and the airfoil members of each aileron assembly is such that the airfoil members in the second position are substantially aligned with the flaps at the flap angle for take-off.

With each airfoil member in its upper location, each airfoil member produces a minimum upward lift force and a maximum upward lift force at its lower location. The intermediate location of each airfoil member is located to produce an upward lift force approximately half-way between the maximum and minimum lift forces.

In the preferred form shown herein, each mounting member comprises a track member defining a track path which has a substantially longitudinal path component. The track member is pivotally mounted at a pivot location at a rear end of the wing for up and down rotational movement. The track member and the aileron airfoil member are so arranged that with the airfoil member in its first position, the pivot location is sufficiently close to the leading edge of the airfoil member to permit movement between the upper and lower locations, with the airfoil upper and lower surfaces remaining within aerodynamic contours of the wing.

The track has a forward portion and a rear portion. The pivot location is located at the forward location, and the airfoil member is arranged relative to the track member so that with the airfoil member in its stowed position, the forward end of the airfoil member is adjacent the forward portion of the track so that rotational movement of the track member causes relatively little linear movement of the leading edge of the airfoil member.

In the preferred form, the wing has a rear cove panel at the upper trailing edge of an upper surface of the wing. The system further comprises slave link means to interconnect the cove panel with the track member so that the cove panel remains in contact with the upper surface of the airfoil member in its first position. The airfoil member maintains a slotted configuration relative to the cove panel in the second position of the flap member.

Further, in the preferred form, the second actuating means comprises an actuator having a first operative connection to the wing and a second operative connection to the leading edge of the airfoil member. The first and second connection are generally aligned on a drive axis, with the drive axis being generally aligned with the pivot location of the track member when the airfoil member is in its stowed position. Desirably, the second connection is a pivot connection being located such that with the airfoil member in its stowed position, the second connection is generally coincident with an axis of rotation of the track member about the pivot location of the track member.

In a particularly desirable specific configuration, each of the second actuating means comprises a linkage having a first pivot connection to the airfoil member and an intermediate pivot connection to the airfoil member at an intermediate pivot connection. The system is characterized with that with the airfoil member in its first position, the first pivot connection is generally coincident with the axis of rotation of the track member. With the airfoil member in its second position, the second pivot connection is generally coincident with the axis of rotation of the track member.

In the method of the present invention, an airfoil assembly is provided as described above. For high speed operation, the method comprises causing the second actuating means to move the airfoil members to the first position and then operate the first actuating means of the two assemblies oppositely to create roll moments for aircraft control. For low speed operation, the method comprises causing the second actuating means to move the airfoil members to the second position and then operating the first actuating means of the two assemblies oppositely to create roll moments for aircraft control. The method of the present invention further comprises operating the mounting members and the airfoil members to create the lift forces recited above with regard to the system of the present invention. Other features of the present invention will become apparent from the following detailed description.

BRIEF DESCRIPTION OF THE DRAWINGS

FIG. 10 is a sectional view taken along Line 10—10 of FIG. 3. DESCRIPTION OF THE PREFERRED EMBODIMENT In FIG. 1, there is shown the outboard portion of an aircraft wing 10 having along the inboard portion of its trailing edge a number of flaps 12 and spoilers 13. At the outer end of the trailing edge of each wing 10, there is an aileron assembly 14. For convenience of illustration, only one side of the aircraft wing is shown, it being understood that there are flaps 12 on both sides of the wing, and two aileron assemblies 14 on opposite ends of the wing, these two assemblies 14 comprising the aileron system of the present invention.

Figure 1:
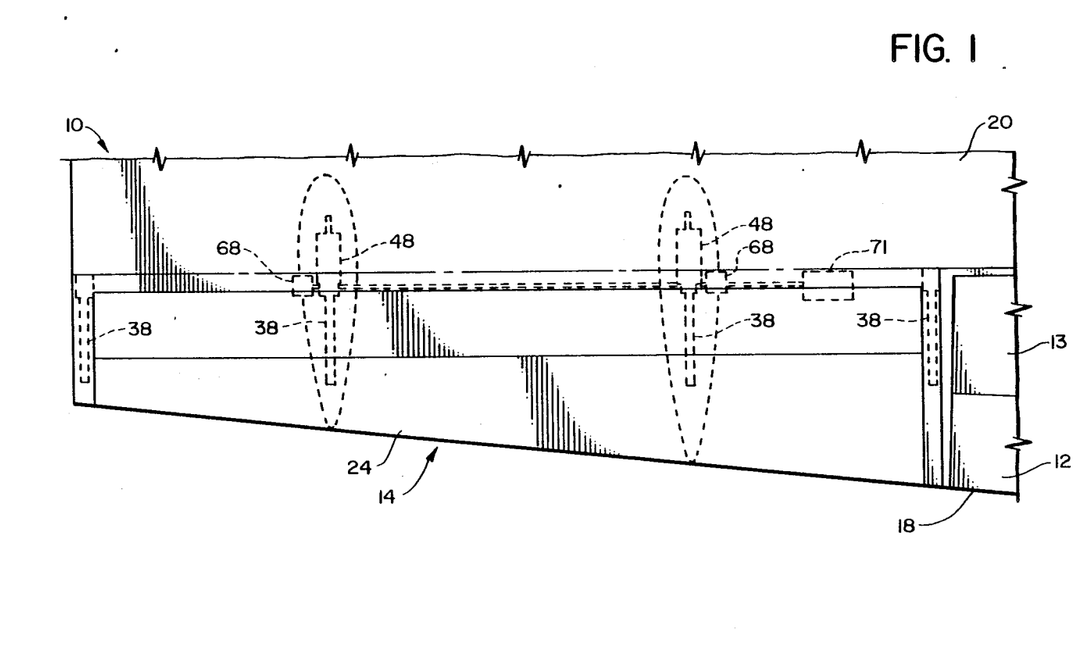
FIG. 1 is a top plan view of a portion of a wing of an aircraft incorporating the aileron system of the present invention.

The flaps 12 are or may be of conventional design, and have a stowed position in the trailing edge of the wing for high speed operation, an intermediate position for take-off, and a fully deployed downwardly and rearwardly extending position for landing. In the intermediate position, the flaps 12 are moved rearwardly and slant downwardly and rearwardly at a moderate angle (e.g. an angle of 10° with the chordwise axis of the wing 10).

The wing 10 has a leading edge 16, a trailing edge 18, and upper aerodynamic surface 20 and a lower aerodynamic surface 22. For convenience of description only one aileron assembly 14 will be described in detail, it being understood that this description applies to both of the assemblies 14.

The aileron assembly 14 comprises two main components, namely an aileron airfoil member 24 and a mounting member for the airfoil member, this mounting member being a track member 26. The airfoil member 24 has a leading edge 28, a trailing edge 30, an upper aerodynamic surface 32 and a lower aerodynamic surface 34. To mount the airfoil member 24 to the track member 26, there is attached to the lower side of the airfoil member 24 at the leading edge thereof, a slide-block 36. This block 36 could be provided in the form of one or more block members or as a plurality of rollers. The slide-block 36 rides in a slightly curved track 38 provided by the track member 26. In a preferred form, the track 38 defines a track path which is nearly straight or curves slightly downwardly in a circular arc which curves from its forward end in a downward direction.

The track member 26 is in turn mounted about a forward pivot location 40 adjacent the rear end of the lower wing surface 22. The track mounting is provided by stub ribs 42 extending rearwardly from the wing rear spar 44.

To rotate the track member 26, there is provided a hydraulic actuator 46 having a cylinder 48 and a piston with a piston rod 50. This hydraulic actuator 46 is positioned just below the lower wing surface 22 and the forward end of the cylinder 48 is pivotally connected at 52 to a bracket 54 which extends downwardly from the lower wing surface 22. The rear end of the piston rod 50 is pivotally connected at 56 to a lower part of the track member 26. With the airfoil member in its intermediate position of FIG. 3, the pivot connection 56 is nearly directly below the pivot connection 40 of the track member to the stubs 42. The track member 26 and hydraulic actuator 46 are positioned within a suitable aerodynamic fairing 58 having a forward portion 58a connected to the lower side of the wing, and a rear portion 58b connected to the lower side of the airfoil member 24. When the track member is rotated downwardly to the position of FIG. 2, the rear fairing portion 58b slides partially inside the rear portion of the forward fairing portion 58a.

At the rear end of the upper wing surface 20, there is provided a cove panel 60 hinge mounted at its forward end at 62 to the upper rear edge of the wing 10. A slave link 64 connects the cove panel 60 to the top portion of the track member 26 a moderate distance rearwardly of its pivot connection 40. The cove panel 60 and the slave link 64 are so arranged that with the airfoil member 24 in its retracted position, the trailing edge 66 of the panel 60 remains in constant contact with the upper surface 32 of the airfoil member 24 when the airfoil member 24 is moved upwardly and downwardly in the high speed mode to the positions shown in FIG. 4 and FIG. 2, respectively.

Figure 8:
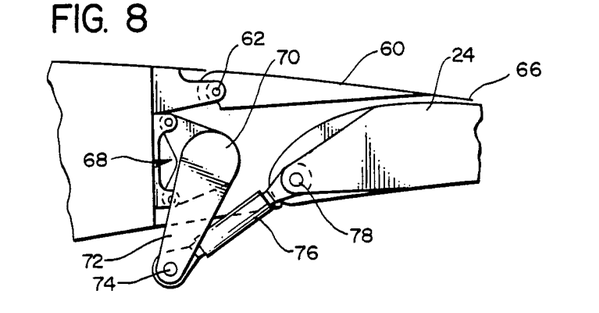
FIG. 8 is a sectional view similar to the other views, showing the actuating mechanism to move the aileron airfoil member between its stowed and extended position, with the airfoil member being in its stowed position.
Figure 9:
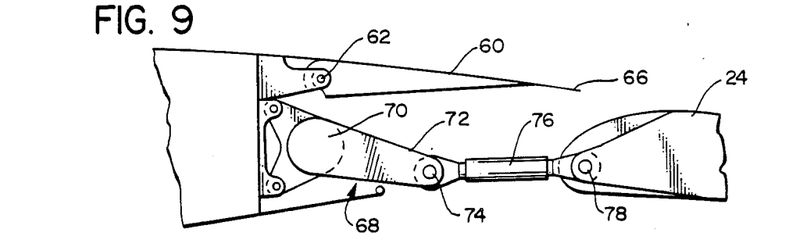
FIG. 9 is a view similar to FIG. 8, showing the actuating mechanism for the airfoil member in its extended position.
Figure 10:
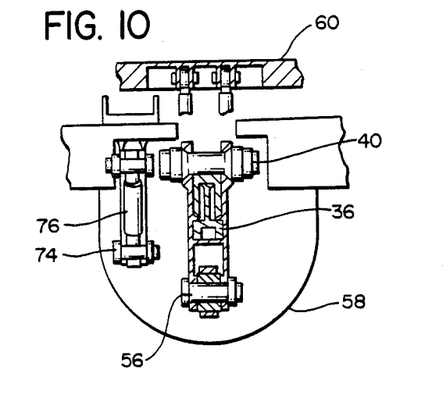

To describe the actuating means to move the airfoil member 24 between its retracted (high speed) and extended (low speed) position, reference is made to FIGS. 8 and 9, which show a rotary hinge actuator 68. This actuator 68 comprises a rotary hinge member 70 driven by a motor 71 and having extending outwardly therefrom an actuating arm 72. Pivotally connected at 74 to the outer end of the arm 72 is a drive link 76, and the opposite end of the drive link 76 is pivotally connected at 78 to the leading edge of the airfoil member 24.

When the airfoil member 24 is in its retracted position, the actuating member 70 is in the position of FIG. 8, with the arm 72 extending downwardly and moderately forwardly. In this position, the link pivot connection 78 lies in substantially the same axis as the pivot location 40 of the track member 26. Thus, with the airfoil member 24 in the stowed position of FIGS. 2 through 4, when there is upward and downward rotation of the track member 26 to cause corresponding upward and downward rotation of the airfoil member 24, there is little if any movement of the connecting point 78 so that there is little or no tendency to move the airfoil member 24 in a fore-aft direction (relative to the track member).

When the actuating mechanism 68 is moved to the extended position shown in FIG. 9, the pivot connection 74 between the drive link 76 and the arm 72 is located at, or very close to, the pivot location 40 for the mounting of the track member 26. Therefore, in the extended position of the airfoil member 24 (shown in FIGS. 5 through 7), upward and downward movement of the track member 26 simply causes rotation of the drive link 76 about the pivot connection 74, and then again there is no tendency to cause the airfoil member 24 to move relative to the track member 26 due to this rotation.

The number and location of the actuating mechanism 68 and also of the hydraulic actuator 46 are selected to move the components without causing racking or jamming. For example, the actuating mechanism 68 can be made in the form of two actuators 68 next to the main support, in a manner to be shafted together and driven from a common power source. The hydraulic actuators 46 could be provided as two actuators connecting to two track member 26 for a single aileron airfoil member 24, as shown in FIG. 1.

Figure 3:
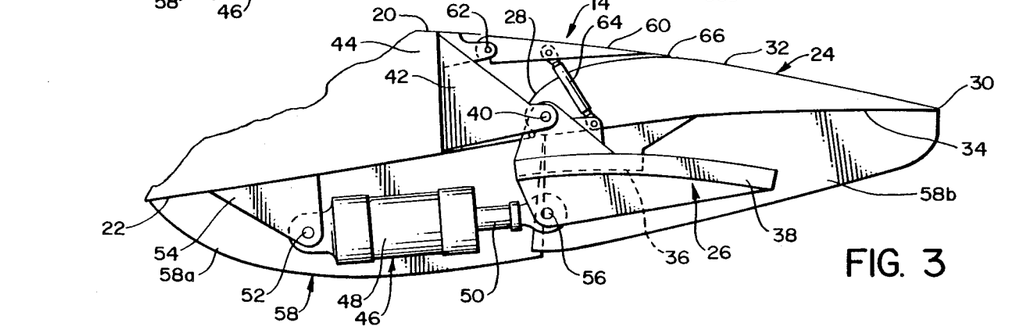

To describe the high speed operation of the present invention, let it be assumed that the two aileron airfoil member 24 are in the position shown in FIG. 3, which is a retracted position with the aileron airfoil member 24 in its intermediate or neutral position. In this position, the trailing edge 66 of the cove panel 60 blends aerodynamically with the upper surface 32 of the airfoil member 24, and the forward portion of the upper surface 32 is concealed in the cove panel 60. The lower wing surface 22 blends into the lower aerodynamic surface 34 of the aileron airfoil member 24 at a location very close to the axis of rotation of the track member 26.

Figures 4, 5:
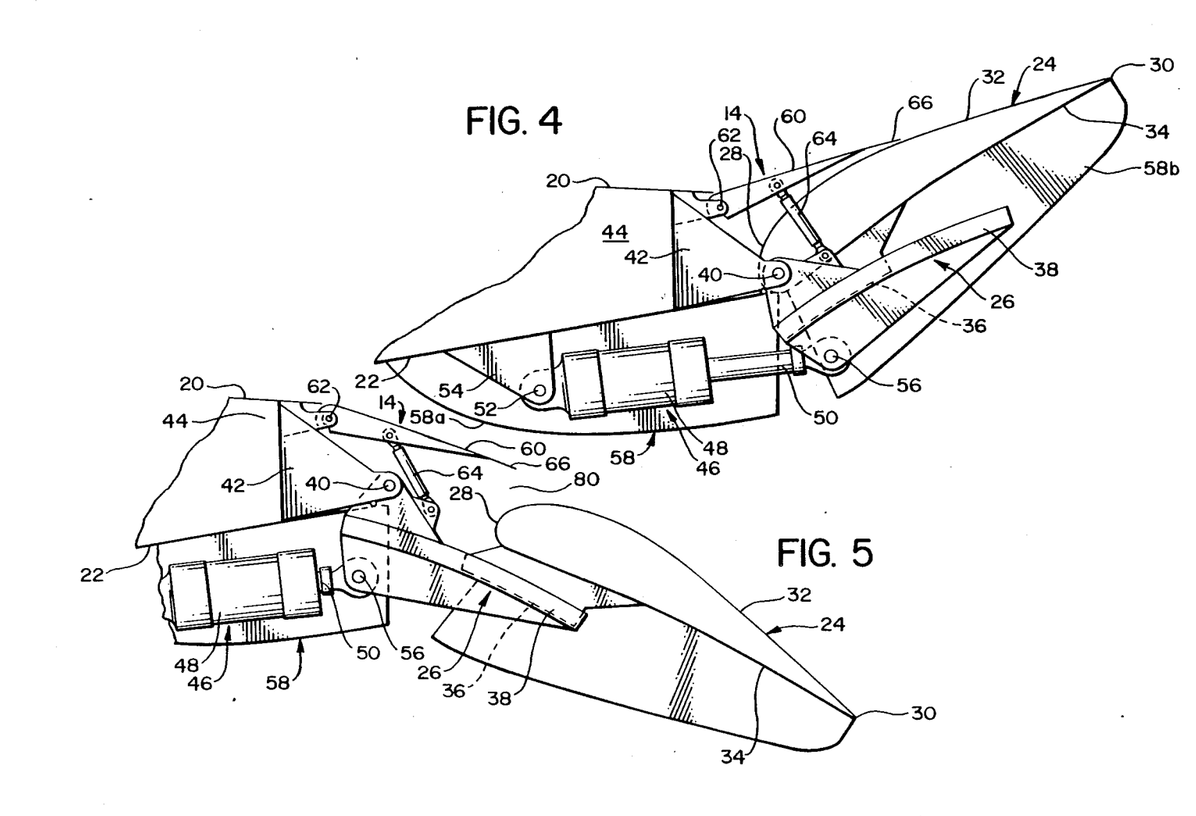
FIGS. 5, 6 and 7 are views similar to FIGS. 2, 3 and 4, respectively, with the aileron airfoil member in its extended position for low speed operation.

Thus, when the hydraulic actuator 46 is extended to move the track member 26 and airfoil member 24 upwardly to the positon of FIG. 4, the cove panel also tilts upwardly to maintain a continuous upper aerodynamic surface between the wing 10 and the airfoil member 24. In a like manner, the lower wing surface 22 maintains a substantially continuous aerodynamic contour with the lower surface 34 of the aileron airfoil member 24.

Figure 2:
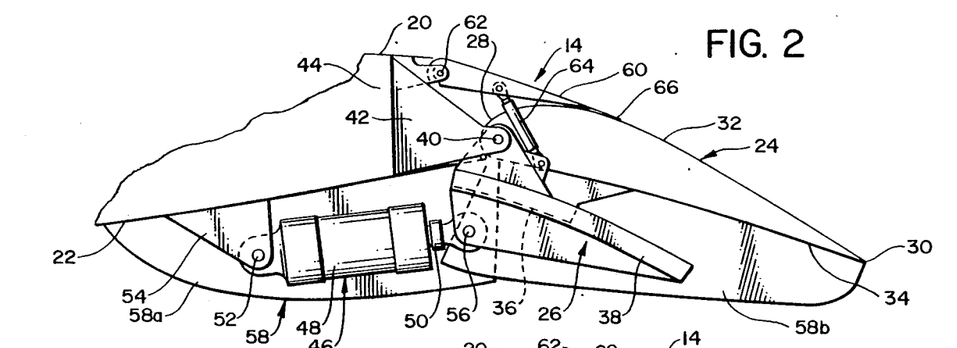
FIGS. 2, 3 and 4 are sectional views taken along a chordwise axis of the wing, showing the aileron airfoil member of the present invention in its retracted position for high speed operation, with FIG. 2 showing the airfoil member deflected downwardly, FIG. 3 showing the airfoil member in its intermediate position, and FIG. 4 showing the airfoil member in its full up position.

When the actuator 46 is retracted to move the track member 26 and airfoil member 24 downwardly to the position of FIG. 2, the slave link 64 keeps the cove panel 60 in contact with the upper surface 32 of the airfoil member 24 so as to maintain the substantially continuous upper aerodynamic surface of the wing 10 and airfoil member 24. Also, the lower substantially continuous aerodynamic surface of the wing 10 and flap member 24 is maintained. As indicated previously, upward and downward rotation of the track member 26 does not cause any slide motion of the airfoil member 24 relative to the track 26, due to the location of the track pivot connection 40 and drive link pivot location 78 being on substantially the same axis.

Figures 6, 7:
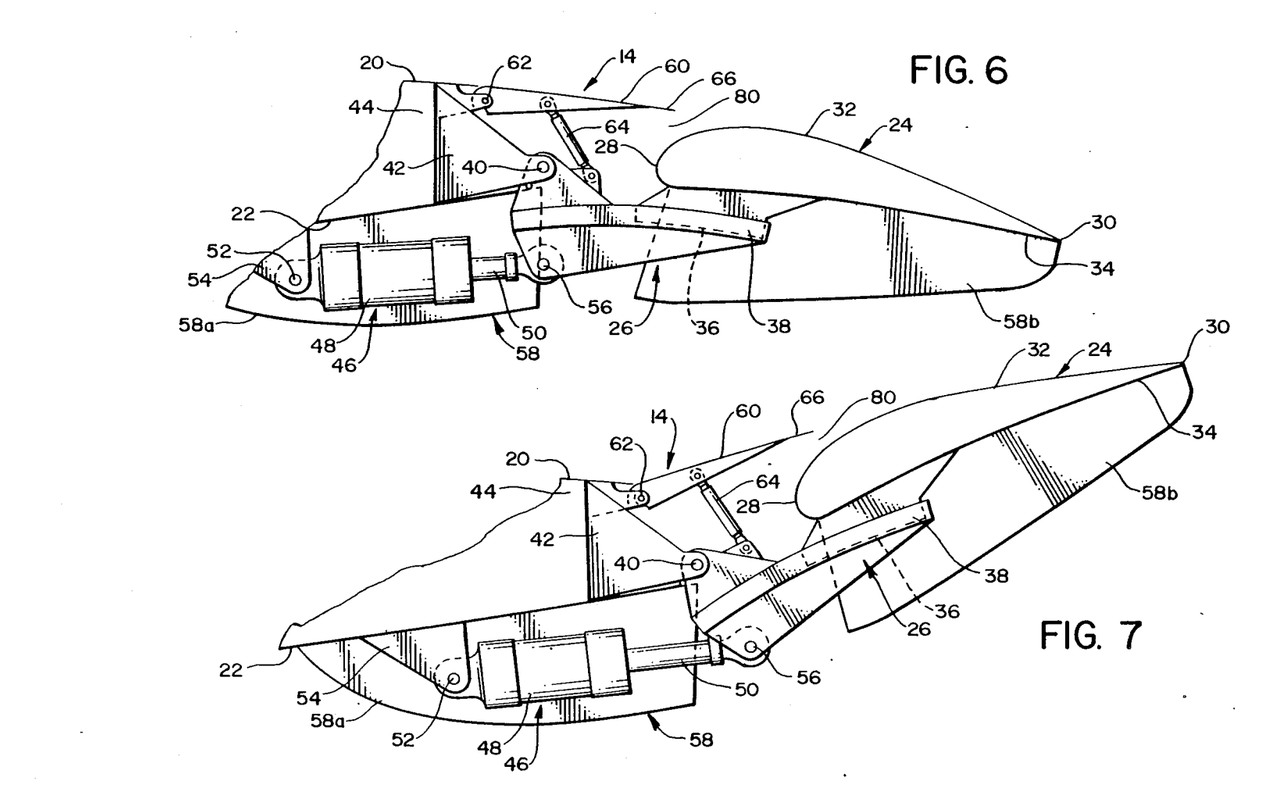

To move the aileron airfoil member rearwardly into the low speed mode, the hinge member 70 of the actuating mechanism 68 is rotated counterclockwise to extend the arm 72 and drive link 76 to the position of FIG. 9. The geometry of the track 38 is such relative to the configuration of the aileron airfoil member 24 that in the extended position shown in FIGS. 5 through 7, a slot 80 opens between the airfoil member 24 and the trailing edge of the cove panel 60. Also, the track configuration is such that the aileron airfoil member is rotated downwardly to an intermediate angular position. Desirably this intermediate angular position is at approximately the same angle at which the flaps 12 are deployed for take-off. In this position, the aileron airfoil member 24 can generate substantially more lift than in the position of FIGS. 2 through 4. The extension of the aileron airfoil member 24 increases the total wetted area of the assembly (i.e. of the cove panel 60 and the aileron airfoil member 24). In addition, the flow through the slot 80 re-energizes the flow over the upper surface of the airfoil member 24 and to a certain extent flow over the aft portion of the upper cove panel 60. The larger areas and the higher aerodynamic loads on these members will make the aileron assembly 14 considerably more effective in producing differential lift increments between sides, which means an increase in rolling moment. The neutral or intermediate aileron position shown in FIG. 6 is selected so that the two aileron airfoil members 24 generate a net lift for take-off and landing. Also, the configuration of the airfoil members 24 and the positioning thereof are selected so that the change in lift created by either upward or downward movement is substantially linear. Thus, when one aileron assembly 14 is moved upwardly to decrease lift and the other assembly 14 is moved downwardly to increase lift, the net affect is that the overall lift remains substantially constant, and there is more of a pure roll movement, without the loss of lift.

To describe now the overall operation of the present invention, let it be assumed that the airplane is taking off at full gross weight, with the flaps 12 being deployed to an intermediate position making an angle, for example, of about 10° with the chord of the wing 10. The aileron airfoil members 24 are extended to the position of FIG. 6 to increase lift in a low drag configuration and be in substantial alignment with the flaps 12. The increase in lift provided by the aileron airfoil members 24 provide a smoother spanwise lift distribution over the entire wing 10, resulting in an improved lift to drag ratio and hence improved take-off performance, which is of particular benefit with a condition where there is one failed engine. The two aileron assemblies 14 can be moved oppositely during take-off for roll control, producing relatively high rolling moments, yet without changing the net lift provided by the system. The maximum upward and downward deflection for low speed roll control are shown in FIGS. 7 and 5, respectively. The neutral position is shown in FIG. 6.

For high speed operation (climb, cruise, descent), as indicate previously, the aileron airfoil members are stowed in the position shown in FIGS. 2 through 4. FIG. 4 shows the maximum up position for roll control, FIG. 2 the maximum down position, with FIG. 3 showing the neutral position. In these positions, the aileron airfoil members 24 behave in a manner quite similar to conventional ailerons.

For landing, the aileron airfoil members 24 are again extended to the neutral position shown in FIG. 6, thus producing increased lift, and allowing a reduction in airplane approach speed, which is particularly beneficial for STOL airplanes. Like in the take-off mode, the up and down deflection of the extended, slotted aileron assemblies 24 produce a high rolling movement without a significant change in net lift. The re-configuration of the aileron from high speed to low speed mode and vice versa may be triggered by a signal from the trailing edge flap lever or may be coupled with a certain airplane speed signal. Partial deployment of the aileron assemblies into an intermediate position between high and low speed mode is possible if desired.

It is to be understood that the above description is intended to disclose the preferred embodiment of the present invention, and various changes could be made without departing from the basic teachings of the present invention.

I claim:

1. An aileron system for a wing of an airplane, said system being adapted for roll control at both high and low speeds, said system comprising:
   (a) two aileron assemblies, positioned at opposite sides of said wing at respective aileron locations, each assembly comprising:
      (i) a mounting structure mounted at the rear end of the wing at its related aileron location for up and down rotation about an axis generally aligned with a spanwise axis of the wing;
      (ii) an aileron airfoil member having a leading edge, a trailing edge, an upper aerodynamic surface and a lower aerodynamic surface, said airfoil member being movably mounted to said mounting structure for movement between a stowed first position where the upper and lower airfoil surfaces aerodynamically match the upper nad lower wing surfaces for roll control for high speed flight, and to an extended high lift second position where the airfoil member forms a slot with a trailing edge of the wing, said airfoil member and said mounting structure being arranged in its assembly in a manner that said mounting structure with the airfoil member can be rotated to upper and lower locations, with the airfoil member in either its stowed first position and its extended second position;
      (iii) a first independent actuating means to rotate the mounting structure from an intermediate location upwardly to said upper location and also downwardly to said lower location,
      (iv) a second independent actuating means to move said airfoil between its first and second positions, said second and first actuating means each being independently operable so that said first actuating means cna rotate said mounting structure independently of any actuation of said second actuating means, so that said mounting structure with said airfoil member can be rotated between said upper and lower locations, with said airfoil member remaining in either its first or second position;
   (b) control means capable of activating both second actuating means to move said airfoil members together between their respective first and second positions, and activating both first actuating means oppositely to move said mounting structures oppositely to one another to create a roll moment,
   whereby for high speed flight said airfoil members can be placed in the first position for low drag and high speed roll control, and said airfoil members can be placed in the second positions to create greater lift components to optimize roll control for low speed operation.

2. The system as recited in claim 1, wherein the two aileron assemblies are characterized in that the intermediate location of each mounting structure is such that the aerodynamic contour of each airfoil member is such that with the two airfoil members in the second position, an increase in upward lift created by downward movement of the mounting structure and the airfoil member of one aileron assembly matches generally a decrease in upward lift by upward movement of the mounting structure and airfoil member of the other aileron assembly, whereby net lift created by the aileron assemblies does not have substantial variation.

3. The system as recited in claim 2, wherein with said airfoil members in their second position, and with the mounting structures and the two airfoil members in their intermediate location, the two airfoil members create a net upward lift so that in executing a roll maneuver, the two airfoil members continue to create a net upward lift.

4. The system as recited in claim 3, wherein the wing has a flap system with flap members located inboard of the aileron assemblies, said flaps having a predetermined flap angle for take-off, the intermediate location of the mounting structure and the airfoil members of each aileron assembly being such that the airfoil members in the second position are substantially aligned with the flaps at the flap angle for take off.

5. The system as recited in claim 4, wherein with each airfoil member in its extended position and at its upper location, each airfoil member produces a minimum upward lift force, and a maximum upward lift force at its lower location, the intermediate location of each airfoil member being located to produce an upward lift force approximately half-way between said maximum and minimum lift forces.

6. The system as recited in claim 3, wherein with each airfoil member in its extended position and at its upper location, each airfoil member produces a minimum upward lift force, and a maximum upward lift force at its lower location, the intermediate location of each airfoil member being located to produce an upward lift force approximately half-way between said maximum and minimum lift forces.

7. The system as recited in claim 2, wherein with each airfoil member in its extended position and at its upper location, each airfoil member produces a minimum upward lift force, and a maximum upward lift force at its lower location, the intermediate location of each airfoil member being located to produce an upward lift force approximately half-way between said maximum and minimum lift forces.

8. The system as recited in claim 1, wherein said mounting member comprises a track member defining a track path which has a substantially longitudinal path component, said track member being pivotally mounted at a pivot location at a rear end of the wing for up and down rotational movement, said track member and said aileron airfoil member being so arranged that with said airfoil member in its first position, the pivot location is sufficiently close to the leading edge of the airfoil member to permit movement between the upper and lower locations, with the airfoil member upper and lower surfaces remaining within aerodynamic contours of the wing.

9. The system as recited in claim 8, wherein said track member has a forward portion and a rear portion, said pivot location being located at said forward portion, said airfoil member being so arranged relative to the track member that with the airfoil member in its stowed position, the forward end of the airfoil member is adjacent said forward portion so that rotational movement of the track member causes relatively little linear movement of the leading edge of the airfoil member.

10. The system as recited in claim 9, wherein the wing has a rear cove panel at an upper trailing edge of an upper surface of the wing, said system further comprising slave link means to interconnect the cove panel with the track member so that the cove panel remains in contact with the upper surface of the airfoil member with the airfoil member in its first position, and said airfoil member maintains a slotted configuration relative to the cove panel in the second position of the airfoil members.

11. The system as recited in claim 8, wherein said second actuating means comprises an actuator having a first operative connection to said wing and a second operative connection to the leading edge of the airfoil member, said first and second connections being generally aligned on a drive axis, said drive axis being generally aligned with the pivot location of the track member when said airfoil member is in its stowed position.

12. The system as recited in claim 11, wherein the second connection is a pivot connection being located such that with the airfoil member in its stowed position, the second connection is generally coincident with an axis of rotation of the track member about the pivot location of the track member.

13. The system as recited in claim 8, wherein each of said second actuating means comprises a linkage having a first pivot connection to said airfoil member and a second intermediate pivot connection, said system being characterized that with the airfoil member in its first position, said first pivot connection is generally coincident with the axis of rotation of the track member, and with the airfoil member in its second position the second pivot connection is generally coincident with the axis of rotation of the track member.

14. In an aileron system for a wing of an airplane, said system being adapted for roll control at both high and low speeds, wherein said system comprises two aileron assemblies, positioned at opposite sides of said wing at respective aileron locations, each assembly comprising:

(a) a mounting structure mounted at the rear end of the wing at its related aileron location for up and down rotation about an axis generally aligned with a spanwise axis of the wing;

(b) an aileron airfoil member having a leading edge, a trailing edge, an upper aerodynamic surface and a lower aerodynamic surface, said airfoil member being movably mounted to said mounting structure for movement between a stowed first position where the upper and lower airfoil surfaces aerodynamically match the upper and lower wing surfaces for roll control for high speed flight, and to an extended high lift second position where the airfoil member forms a slot with a trailing edge of the wing, said airfoil member and said mounting structure being arranged in its assembly in a manner that said mounting structure with the airfoil member can be rotated to upper and lower locations, with the airfoil member in either its stowed first position and its extended second position;

(c) a first independent actuating means to rotate the mounting structure from an intermediate location upwardly to said upper location and also downwardly to said lower location, (d) a second independent actuating means to move said airfoil between its first and second positions, said second and first actuating means each being independently operable so that said first actuating means can rotate said mounting structure independently of any actuation of said second actuating means, so that said mounting structure with said airfoil member can be rotated betweeen said upper and lower locations, with said airfoil member remaining in either its first or second position.

a method of operating said system, said method comprising:
  (a) for high speed operation, causing the second actuating means to move the airfoil members to the first position and then operating the first actuating means of the two assemblies oppositely to create roll moments for aircraft control;
  (b) for low speed operation, causing the second actuating means to move the airfoil members to the second position and then operating the first actuating means of the two assemblies oppositely to create roll moments for aircraft control.

15. The method as recited in claim 14, further comprising locating each mounting structure and each airfoil member in the second position, and at the intermediate location to create an increase in upward lift by downward movement of the mounting structure and the airfoil member of one aileron assembly to match generally a decrease in upward lift by upward movement of the mounting structure and airfoil member of the other aileron assembly, whereby net lift created by the aileron assemblies does not have substantial variation.

16. The method as recited in claim 15, further comprising locating said airfoil members in their second position, and locating the mounting structures and the two airfoil members in their intermediate location in a manner that the two airfoil members create a net upward lift so that in executing a roll maneuver, the two airfoil members continue to create a net upward lift.

17. The method as recited in claim 16, wherein the wing has a flap system with flap members located inboard of the aileron assemblies, said flaps having a predetermined flap angle for take-off, said method further comprising locating the mounting structure and the airfoil members of each aileron assembly so that the airfoil members in the second position and at the intermediate location are substantially aligned with the flaps at the flap angle for take-off.

* * * * *